(12) United States Patent
Fusco et al.

(10) Patent No.: US 8,782,012 B2
(45) Date of Patent: Jul. 15, 2014

(54) NETWORK ANALYSIS

(75) Inventors: Francesco Fusco, Zurich (CH); Marc P Stoecklin, Riverdale, NY (US); Michail Vlachos, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/218,566

(22) Filed: Aug. 26, 2011

(65) Prior Publication Data

US 2012/0054161 A1 Mar. 1, 2012

(30) Foreign Application Priority Data

Aug. 27, 2010 (EP) .................................. 10174367

(51) Int. Cl.
*G06F 7/00* (2006.01)
*G06F 17/00* (2006.01)
*G06F 17/30* (2006.01)

(52) U.S. Cl.
USPC ........................... 707/673; 707/741; 707/745

(58) Field of Classification Search
USPC ........................................ 707/673, 741, 745
See application file for complete search history.

(56) References Cited

U.S. PATENT DOCUMENTS

| | | | |
|---|---|---|---|
| 5,546,575 A * | 8/1996 | Potter et al. ........................... | 1/1 |
| 6,831,575 B2 | 12/2004 | Wu et al. | |
| 6,882,746 B1 * | 4/2005 | Naveen et al. ................ | 382/173 |
| 8,145,642 B2 * | 3/2012 | Cruanes et al. ............... | 707/745 |
| 2007/0005556 A1 * | 1/2007 | Ganti et al. ....................... | 707/1 |
| 2009/0192980 A1 * | 7/2009 | Beyer et al. ....................... | 707/2 |
| 2010/0083101 A1 * | 4/2010 | Denoual et al. ............... | 715/242 |

OTHER PUBLICATIONS

Qin LV et al, Multi Probe LSH: Efficient indexing fro high-dimensional similarity search, Sep. 2007.*
Reiss et al., "Enabling Real-Time Querying of Live and Historical Stream Data," 19th Conference on Scientific and Statistical Database Management, 2007, p. 28.
Li et al., "G. MIND: Aditributed Multi-dimensional Indexing System for Network Diagnosis," In IEEE INFOCOM (Barcelone, Spain, Apr. 2006).
Morariu et al., "DIPStorage: distributed storage of IP flow records," In: 16th IEEE Workshop on Local and Metropolitan Area Networks (LANMAN 2008), Cluj-Napoca, Romania, Sep. 3-6, 2008, pp. 108-113.

* cited by examiner

*Primary Examiner* — Mariela Reyes
(74) *Attorney, Agent, or Firm* — Cantor Colburn LLP (57) ABSTRACT

Methods and a device for providing a compressed index of binary records. A method includes: sorting the records by content of a predetermined field of the record, indexing the field from one of the records in a line of a bitmap index, compressing bits in a column of the bitmap index by replacing a group of successive bits with a code, where the sorting includes the steps of assigning, for each record, a hash bucket of a hash table on a basis of a locality sensitive hash function on the contents of the predetermined field, so that the probability for two of the records to be assigned to the same has bucket increases with the similarity of the contents of the predetermined field between the records, and where at least one step of the computer implemented method is executed on a computer device.

14 Claims, 8 Drawing Sheets

NETWORK ANALYSIS

CROSS-REFERENCE TO RELATED APPLICATION

This application claims priority under 35 U.S.C. §119 from European Patent Application No. 10174367.2 filed Aug. 27, 2010, the entire contents of which are incorporated herein by reference.

BACKGROUND OF THE INVENTION

1. Field of the Invention

The invention relates to an indexing device and a method for providing an index for a stream of data. More particularly, it relates to a method for providing a compressed index for a stream of binary records, and a compressed index for a stream of binary records.

2. Related Art

In and between computer networks, communication may have to be recorded for security, management and maintenance reasons. In order to post process the saved communication, data indices can be used which sum up the information of certain fields of the records that form the communication.

A data index can be implemented as a bitmap index, which is a matrix with columns for each distinct value a field can represent and rows for the actual values. For a particular record, the column that matches the value in a predetermined field of the record is filled with a binary 1 while the other columns are filled with binary 0s. The columns of the bitmap index are then encoded with a run length encoding. The encoding is chosen such that pattern-matching with search patterns containing Boolean operators such as "AND", "OR" can be carried out on the compressed columns, e.g. "records in which the sender's address is in range X AND the recipient's address is in range Y". One such coding is known as Word Aligned Hybrid Code ("WAH") and published in U.S. Pat. No. 6,831,575.

In order to minimize bitmap index sizes, a method called FastBit, which implements the WAH coding, facilitates an optional offline sorting of records before they are encoded. In an online system, where a potentially endless stream of records must be indexed and processed quickly, offline sorting is heavy on computing resources and works only on more or less arbitrary chunks of records, which can degrade sorting quality.

SUMMARY OF THE INVENTION

One aspect of the invention is a computer implemented method for providing a compressed index for a stream of binary records, the method including the steps of: sorting the records by content of a predetermined field of the record, indexing the field from one of the records in a line of a bitmap index, compressing bits in a column of the bitmap index by replacing a group of successive bits with a code, where the sorting includes the steps of assigning, for each record, a hash bucket of a hash table on a basis of a locality sensitive hash function on the contents of the predetermined field, so that the probability for two of the records to be assigned to the same hash bucket increases with the similarity of the contents of the predetermined field between the records, and where at least one step of the computer implemented method is executed on a computer device.

Another aspect of the present invention is an indexing device including: a communication interface for sampling a stream of binary records; a processing unit for providing a compressed index for the stream; and a repository for storing compressed columns formed by the processing unit.

Yet another aspect of the present invention is computer implemented method for providing a compressed index for a stream of binary records. The method including the steps of: sorting the records based on a similarity of the binary records to content of a predetermined field associated with the records, wherein part of the sorting is accomplished by assigning each record to a hash bucket of a hash table on a basis of a locality sensitive hash function on the contents of the predetermined fields, so that the probability for two of the records to be assigned to the same hash bucket increases with the similarity of the contents of the predetermined field between the two records, indexing the field from one of the records in a line of a bitmap index, compressing bits in a column of the bitmap index by replacing a group of successive bits with a code, and where at least one step of the computer implemented method is executed on a computer device.

BRIEF DESCRIPTION OF THE DRAWINGS

In the following, the invention is described in more detail with reference to the accompanying drawings, in which.

DETAILED DESCRIPTION OF THE PREFERRED EMBODIMENTS

It is an object of the invention to provide a method for indexing a stream of data with improved support for compression. It is another object of the invention to provide an indexing device for implementing the method.

The object is solved by at least by a method with the features of claim 1, a method with the features of claim 15, a computer readable storage medium with the features of claim 12, computer readable storage medium with the features of claim 18, and a device with the features of claim 13.

A first aspect of the invention relates to a method for providing a compressed index for a stream of binary records. The method includes the steps of sorting the records by the contents of a predetermined field of the record, indexing the field from one of the records in a line of a bitmap index and compressing bits in a column of the bitmap index by replacing a group of successive bits with a code.

The sorting includes assigning to each record a bucket of a hash table on the basis of a locality sensitive hash function on the contents of the predetermined fields, so that the probability for two of the records to be assigned to the same hash bucket increases with the similarity of the contents of the predetermined fields between the records.

By using a probabilistic approach, online sorting can be facilitated with moderate requirements to processing resources. The probability of incorrect sorting of individual records can be kept as low as required by tuning parameters of the sorting.

Good sorting results can be achieved independent of how values of the predetermined fields are actually distributed among the records. Records that are similar to one another can be kept in the hash bucket until there are enough records to beneficially perform bitmap indexing on the kept records followed by run length encoding on a column of the index.

The locality sensitive hash function can includes creating a first vector with the predetermined fields as elements, creating a second vector with random numbers of a Gaussian distribution as elements, projecting the first vector onto a scalar by generating the dot product of the first vector and the second vector and determining the hash bucket on the basis of the scalar.

The Gaussian distribution is 2-stable, it can be shown that records which are close to each other will be mapped to the same hash bucket with high probability and to distinct hash buckets with a low probability.

In order to enhance assigning the correct hash bucket, the above process can be repeated with different second vectors and the scalars that result from the individual determinations can be summed up and modulo divided by the number of hash buckets in the hash table. The result can be an index of the hash bucket.

The probability of assigning the same hash bucket to similar hashes and different hash buckets to dissimilar records can be influenced by varying the number of times the mapping process is repeated. By modifying the number of hash buckets in the hash table, sorting quality can be traded against compactness of the hash table.

In a preferred embodiment, for each record a scalar quantity is determined on the basis of another locality sensitive hash function that is independent from the first locality sensitive hash function and the records inside the hash buckets are sorted according to the determined quantities of the records. This way, a second layer of sorting can be introduced that can group together similar records in one hash bucket. This way, similar records can be grouped together even if they were assigned to an incorrect hash bucket, i.e. a hash bucket with records they are dissimilar to.

Should the determination of the hash bucket be correct, sorting the records after the determined quantities will not degrade performance of the sorting. Upon writing out the hash bucket, the hash bucket is linearized and the similar records stay together so that a following run length encoding can benefit from the order of the records.

Each record can be a record of the Internet Protocol or a record of the Netflow protocol. The field can include a source address, a destination address, a source port, a destination port and a protocol type. By directly supporting these protocols which are relevant for monitoring computer communication in a network, an efficient tool for network analysis, monitoring, screening, verification, accounting and planning can be given.

If the total number of records held in the hash table exceeds a first predetermined number, the hash bucket that is assigned the greatest number of records can be output and purged until the total number of records held in the hash table falls below a second predetermined number. This way, the output hash buckets can contain chains of similar records that can be profitably encoded in a run length encoder. At the same time, hash table size can be kept moderate.

A second aspect of the invention relates to a computer program product with means implementing the described method. The computer program product can be executed on a processing unit and/or be stored on a computer readable medium.

A third aspect of the invention relates to an indexing device for providing a compressed index for a stream of binary records, where the device includes a communication interface for sampling the stream, a processing unit adapted to carry out the above method and a repository for storing the compressed columns. In one embodiment of the invention, the indexing device can also include a random number generation device which supplies numbers with a Gaussian distribution.

The field can be a header field and the processing unit can be adapted to accept a query including a search pattern for header fields and to return from the repository the stored portion of a data record whose header fields match the search pattern.

Figure 1:
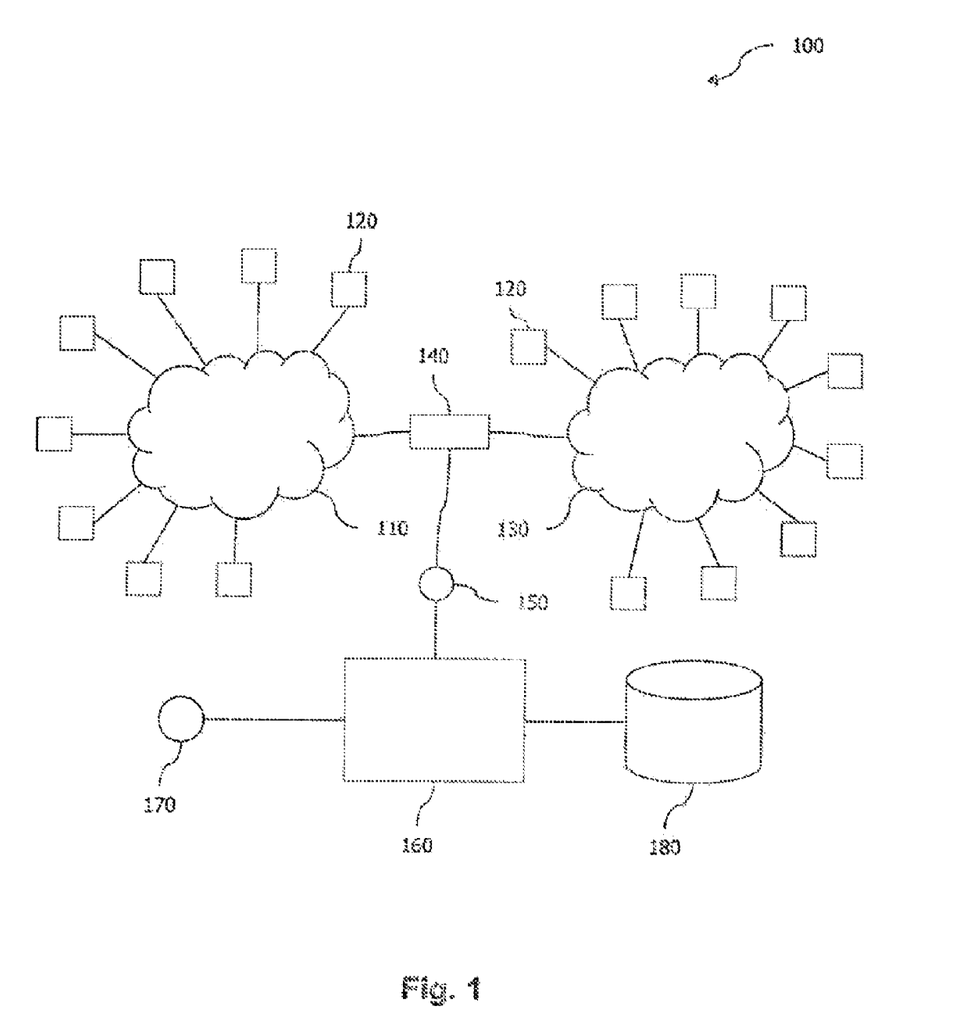
FIG. 1 illustrates a computer network.

FIG. 1 shows a computer network 100. The computer network 100 includes a first subnetwork 110 which is connected to a number of computers 120 and a second subnetwork 130 which is also connected to a number of computers 120. A router 140 or another networking component directs traffic between the first subnetwork 110 and the second subnetwork 130. Any of the computers 120 can communicate with any other of the computers 120. Any of the subnetworks 110 and 130 can also be connected to one or more other networks. Specifically, any of the subnetworks 110 and 130 can be part of a larger computer network, which can be a portion of the internet.

Communication between a first computer 120 which is connected to the first subnetwork 110 and a second computer 120 which is connected to the second subnetwork 130 must be routed over the router 140. Via a networking interface 150, an indexing computer 160 is connected to the router 140. The router 140 provides a copy of the communication between computers 120 on the different subnetworks 110, 130 to the indexing computer 160.

Alternatively, the router 140 creates a summary for each communication between said computers 120 and provides the summary to the indexing computer 160. In yet another embodiment, the router 140 can be omitted and communication is sent by the networking interface 150 so that the communication is relayed unaltered between subnetworks 110, 130 and a copy of the communication is available to an indexing computer 160.

Indexing computer 160 has connections to an operation interface 170 and a repository 180. The indexing computer 160 is adapted to process the information received via the networking interface 150 and to store at least a portion of it in compressed form in the repository 180.

Additionally, the indexing computer 160 is adapted to provide a compressed index for the information stored in the repository 180. Through the operation interface 170, an operator or another computer can control the operation of the indexing computer 160. Specifically, the indexing computer 160 is adapted for use with the operation interface 170 to accept a query and to return a portion of the information stored inside the repository 180 in response to the query.

FIG. 2 shows two exemplary binary data records 200 that can be received by indexing computer 160 via the networking interface 150. While the invention in its most general form is applicable to all kinds of records 200 that include at least one recognizable field with information that will later be searched for, it is primarily the area of computer networks for which the invention is optimized. The two records 200 in FIG. 2 will be used as exemplary embodiments in order to further explicate the invention.

Figure 2A:
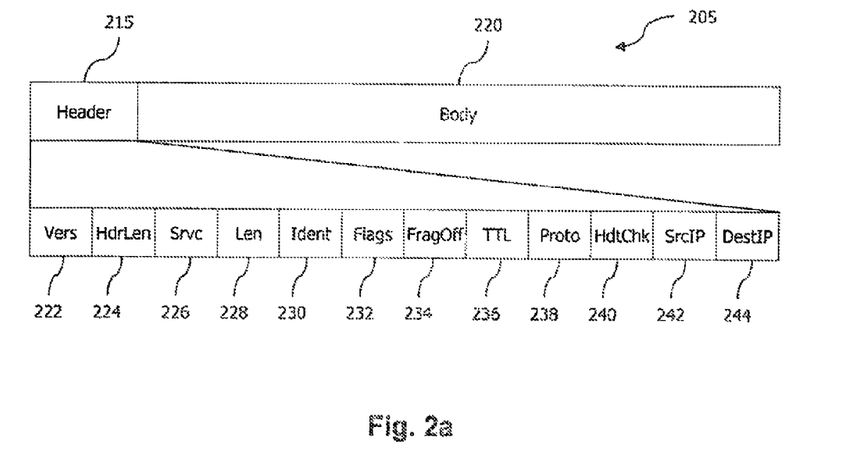
FIG. 2 illustrates exemplary binary data records used in FIG. 1.
Figure 2B:
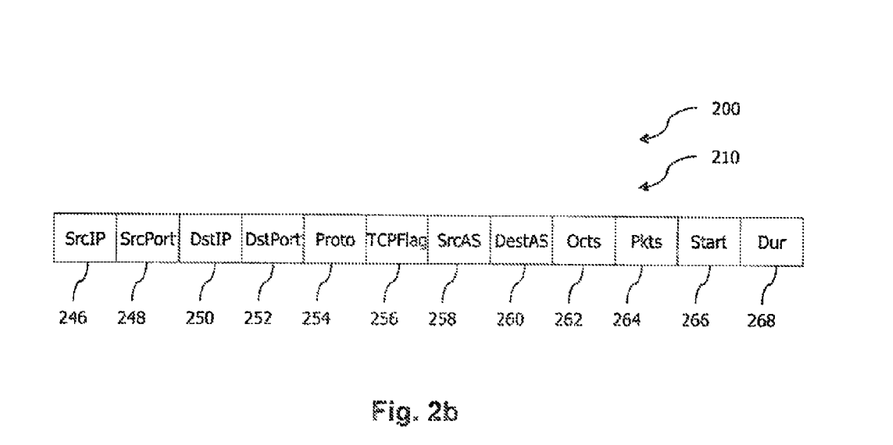

In FIG. 2a, the binary data record 200 comes in the form of an Internet Protocol Record 205 and in FIG. 2b, record 200 is in the form of a Netflow record 210. The invention is also applicable to nested records 200, where a part of the record 200 carries another record of another protocol and the other record includes at least one recognizable field. Indexing can then be carried out on one or several fields of the other record.

In FIG. 2a, the internet record 205 is divided into a header 215 and a body 220. The header 215 contains administrative data and the body 220 contains payload data to be transported from one computer 120 to the other. The header 215 includes header fields 222 through 244. Communication between the two computers 120 is divided into internet records 205 which can have variable but limited in size.

In most cases, it takes a series of internet records 205 to carry one complete message from one computer 120 to the other one. A complete two-way communication additionally includes a series of internet records 205 from the other computer 120 to the first one. Note that the drawing of FIG. 2a is only exemplary and cannot comply with all requirements of the Internet Protocol.

Header field 242 identifies a source address which is a unique address associated to the computer 120 that transmits the information contained in the body 220. Similarly, the destination address 244 contains the unique address which is associated to the computer 120 to which the internet record 205 is to be transported. In Internet Protocol version 4 (IPv4), addresses are each 32 bits long, and in version 6 (IPv6), they are each 128 bits long. A protocol 238 usually indicates on whether the communication is record-oriented or connection-oriented.

The remaining fields 222 through 240 contain more administrative information that can primarily be relevant for transporting the record 200 inside the network 100 of FIG. 1 via intermediate computers or routers and will not be described here in more detail.

In FIG. 2b, the Netflow record 210 is shown, which is also known as Jflow, NetStream, Cflowd or sflow record. Netflow record 210 is a summary of a conversation from the first to the second computer 120 and generally covers a sequence of internet records 205.

Several of the shown Netflow records 210 can form the body of a record 200 that describes a network flow. One Netflow record 210 can contain information on the first of the computers 120 sending an HTTP GET request to the second computer 120. A second Netflow record 210 (not displayed) can contain information on the corresponding HTTP response from the second to the first computer 120.

The complete conversation between the two computers 120 can be derivable from the two corresponding Netflow records 210. Note that the drawing of FIG. 2b is only exemplary and may not comply with all requirements for an actual Netflow Record.

Netflow record 205 includes fields 246 through 268. Field 246 contains the source address and field 250 the destination address of the communicating computers 120 as described above with reference to FIG. 2a. Field 264 indicates how many records were sent from the first to the second computer. Field 268 gives an indication on how long the connection between computers 120 lasted. More administrative information is held in the other shown fields 246-268.

In many cases, records 200 that are stored inside the repository 180 will be searched by source and destination addresses as defined in header fields 242 and 244 for an internet record 205 or fields 246 and 250 for a Netflow record 210. For instance, if one of the computers 120 is suspected of spreading malware, a search conducted via the operation interface 170 can be directed to all internet records 205 in the repository 180 where the source address 215 matches the address of the computer 120 in question.

By analyzing the bodies 220 of the found internet records 205, the suspicion can be substantiated or disproved. Should traces of the malware be found in the bodies 220, a recursive search on communication partners of the computer 120 in question at an earlier time can be conducted, such as to find out from where the malware came.

Figure 3:
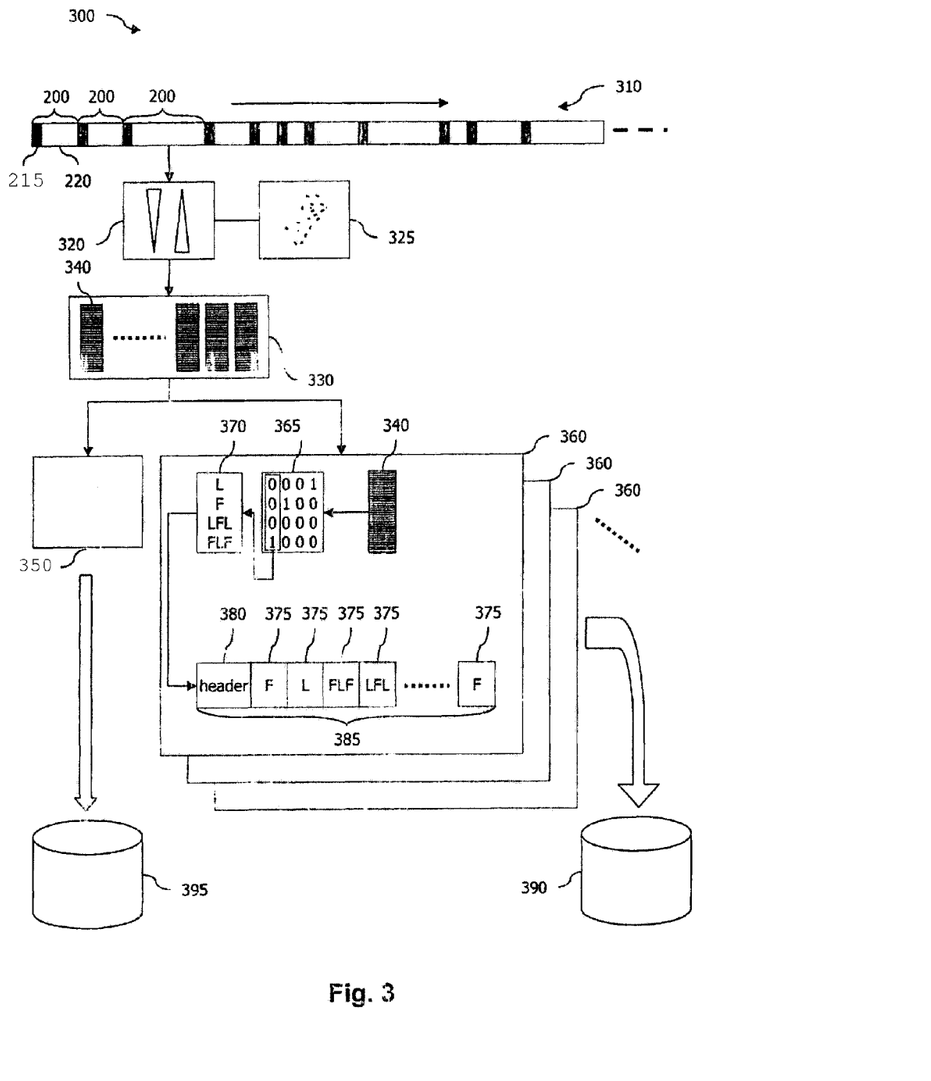
FIG. 3 illustrates an overview of a network analysis tool for the network of FIG. 1 according to an embodiment of the present invention.

FIG. 3 shows an overview over a network analysis tool 300 for providing a searchable recording of the network communication over the router 140 in FIG. 1. The network analysis tool 300 is an expanded view of the indexing computer 160 with repository 180 in FIG. 1.

In an upper portion of FIG. 3, a stream 310 of records 200 according to FIG. 2 is shown. In the shown example, the records 200 are internet records 205 with variable sizes, each including a header 215 and a body 220. As is obvious to a person skilled in the art, an implementation on the basis of the Netflow records 210 according to FIG. 2b is also possible.

After reading the records 200 from the stream with the networking interface 150 (not shown in FIG. 3), the read records 200 are routed through a sorting block 320 that sorts the records 200 so that records 200 which have a high similarity with respect to selected ones of the header fields 222-244 or fields 246-268, are sorted close to each other, while records 200 with a low similarity are sorted further apart from each other. The sorting block 320 can operate on chunks including a predetermined number of records 200.

Sorting block 320 functions on the basis of a probabilistic approach for which random numbers are required. An optional random number generator 325 can be provided as a source for the random numbers.

The random number generator 325 can in fact be a pseudo random number generator that generates a deterministic sequence of numbers with a standard distribution. Often, a so-called seed is used as a basis, the seed being a number that is derived from an external event like a user input or the local time. In another embodiment of the invention, random number generator 325 derives the random numbers from a highly unpredictable physical phenomenon like the noise generated by an electrical resistor or the movements of a double pendulum.

The sorted stream 310 is fed into a chunking block 330 which optionally groups the records 200 into chunks 340 of a predetermined size, e.g. 4000 records 200. The chunking block 330 also splits up the records 200 into headers 215 which are relayed to a plurality of indexing blocks 360 and bodies 220 which are relayed to a compressing block 350. Preferably, several indexing blocks 360 work in parallel.

In a less preferred embodiment, there is only one indexing block 360.

In yet another embodiment there is one dedicated indexing block 350 provided for each of the header fields 222-244 or fields 246-268 to be indexed and at least some of the indexing blocks 350 operate in parallel. Compressing in compressing block 350 can also run in parallel. Parallel processes can be implemented as simultaneous threads inside one or several computers.

Inside an indexing block 360, one or several of the header fields 222-244 or fields 246-268 is transformed into a bitmap index by means of a bitmapping block 365. The created bitmap index is then coded by means of a coding block 370 which uses a code book to group bits in columns of the bitmap index together. This can be done with the Word Aligned Hybrid Code code, which is implemented, for instance, in an Open Source project called FastBit.

Several coded bitmaps 375 that each represents a portion of the bitmap index of bitmapping block 365 are supplied with a reference 380 that relates them to the actual records 200 that the coded bitmaps 375 were derived from. The coded bitmaps 375 together with the reference 380 form an entry 385 that is written to a first repository 390.

At least a portion of the body 220 of the records 200 of the chunk 340 is compressed inside the compressing block 350 using a known compressing algorithm such as the Lempel-Ziv algorithm.

In a further embodiment, the uncompressed and un-encoded header fields 222-244 or fields 246-268, or at least a portion of them, can be compressed along with the portion of the body 220 inside the compressing block 350. The result of the compression of compressing block 350 is then stored in a second repository 395.

In some embodiments, repositories 390 and 395 can be represented by a single repository, such as a set of files and a hard disc or a data base.

One or both repositories 390, 395 can be part of repository 180 in FIG. 1.

Figure 4:
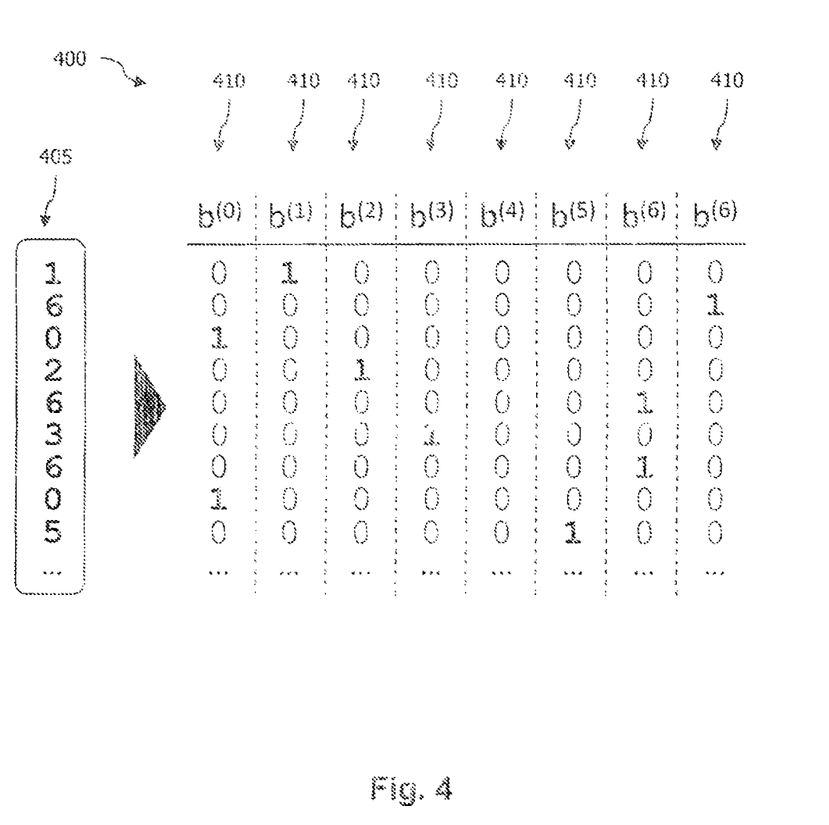
FIG. 4 illustrates a bitmap index according to an embodiment of the present invention.

FIG. 4 shows a bitmap index 400. On the left-hand side of FIG. 4, a sequence 405 of values of one of the header fields 222-244 or fields 246-268 of records 200 of FIG. 2 is shown in vertical. The shown sequence 405 can occur in headers 215 of successive records 200 inside a chunk 340 that is processed by one of the indexing blocks 360 of FIG. 3.

On the right-hand side of FIG. 4, the values of the header fields 222-244 or fields 246-268 are expanded in such a way that for every possible value of the respective header field 222-244 or fields 246-268, a separate column 410 is kept that is associated with one of the possible values.

In FIG. 4, the sequence 405 carries values between 0 and 6, therefore, there are seven columns 410. The value that is associated to each column is shown as an exponent of "b" on top of each column 410, yielding columns $b^0$ through $b^6$. For each value in the sequence 405, one line of binary 0s and 1s is written to the bitmap index 400. The column 410 with the exponent that matches the value will be supplied a binary 1, all other columns a binary 0. The bitmap index 400 thus contains only binary values 1 and 0, where the binary 1s are sparse.

In an alternative embodiment, binary 0s and binary 1s can be swapped in their meaning so that the bitmap index 400 will be sparse with binary 0s and frequent with binary 1s. Such a transposition and its effects to further processing are obvious to those skilled in the art and will not be carried out any further.

The transformation of the values of the sequence 405 into the bitmap index 400 on the right-hand side of FIG. 4 is carried out by the bitmapping block 365 of FIG. 3.

Figure 5:
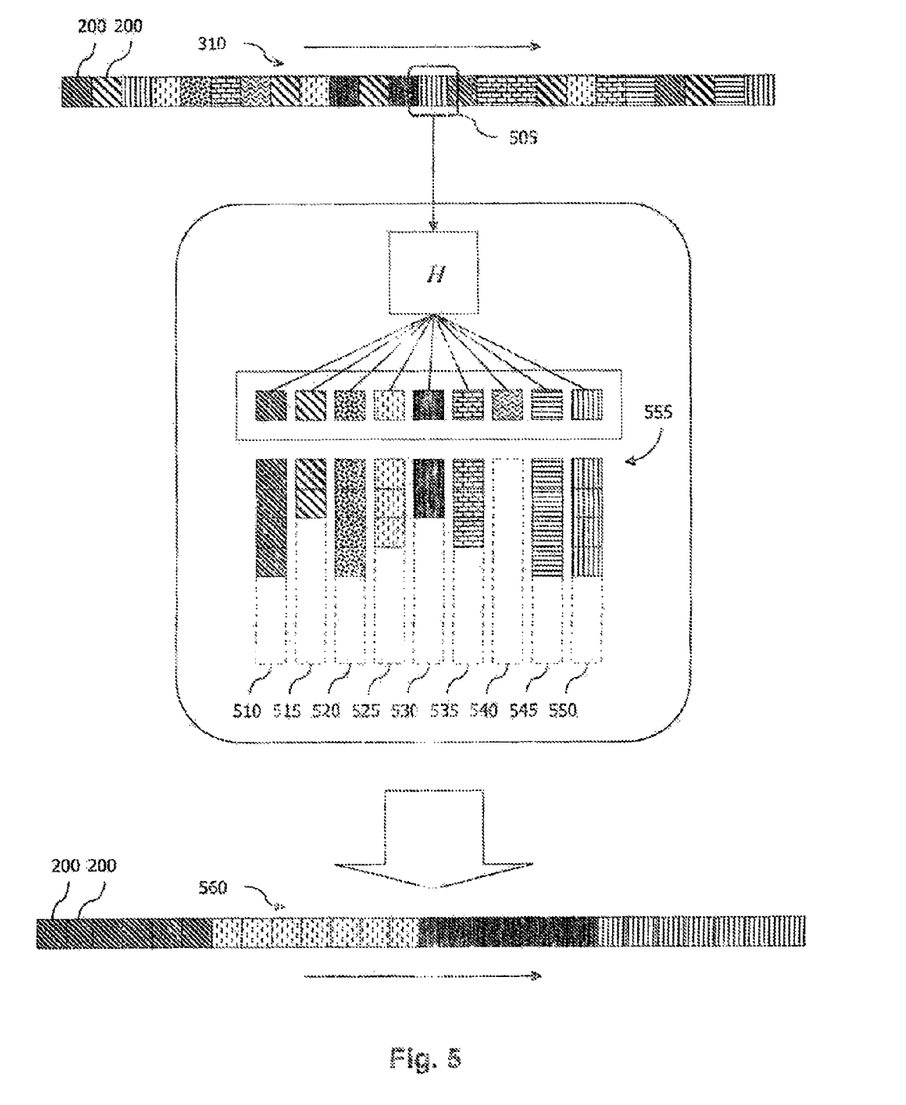
FIG. 5 illustrates an overview of the sorting block of FIG. 3, and is according to an embodiment of the present invention.

FIG. 5 shows an overview of the operation of sorting block 320. The stream 310 carries records 200 with different header fields 222-244 or 246-268.

In FIG. 5, records 200 that have header fields 222-244 or 246-268 which are similar to one another are displayed with identical patterns while records 200 with header fields 222-244 or 246-268 that are not similar to one another carry different patterns. The stream 310 moves from left to right past a symbolic read head 505 that picks up the records 200 one by one and relays them into sorting block 320.

Inside sorting block 320, the record header fields 222-244 or 246-268 of the read record 200 is subjected to a hashing function H which assigns the record 200 to one of hash buckets 510-550. Ideally, the records 200 that are accumulated in each of the hash buckets 510-550 are similar to each other and dissimilar to records 200 in the other hash buckets 510-550. Together, hash buckets 510-550 form a hash table 555.

When the number of records 200 in the hash table 555 exceeds a first predetermined threshold, the hash bucket 510-550 with the greatest number of records 200 is output to an output stream 560 and then purged. After successful sorting, the output stream 560 contains sequences 565 of records 200 that are similar to one another. The output stream 560 is then fed into chunking block 330 in FIG. 3 which collects a number of received records 200 into chunks 340.

Outputting the hash bucket 510-550 with the greatest number of records 200 is repeated until the total number of records 200 in the hash table 555 is smaller than a second predetermined threshold. Outputting hash buckets 510-550 can also be triggered if one of the hash buckets 510-550 holds more records 200 than a third predetermined threshold. In one embodiment, this condition will only trigger the outputting of this particular hash bucket 510-550 while in another embodiment, hash buckets 510-550 will be output until the number of records 200 in the hash table 555 is smaller than the second predetermined threshold.

In one embodiment, all hash buckets 510-560 of the hash table 555 are output to the output stream 560 if the total number of records 200 in the hash table 555 falls below a fourth predetermined threshold. After that, processing of records 200 inside sorting block 320 can terminate.

To explain the operation of the hashing function H in sorting block 320, the following must be considered. The bitmap index 400 will be filled in a line-oriented fashion. Records 200 that arrive consecutively at indexing block 360 will therefore be transposed into adjacent lines in bitmap index 400. Coding of bitmap index 400 will be done by its columns 410. Compression is generally achieved by coding a sequence of binary 0s in a column 410 with a code that is shorter than the sequence.

The object of sorting block 320 is therefore to sort records 200 such that there are longer sequences of records 200 that differ only a little from one another. Mathematically speaking, the records 200 are to be sorted by the similarity of predetermined ones of their header fields 222-244 or 246-268.

For the sorting, it is not so much important that the best possible sequence of records 200 is established. One reason for this is that the stream 310 of records 200 can be considered endless and an optimal sequence of records 200 can not be practically achievable. It is however of importance to perform the sorting quickly and so that it does not consume too many processing resources. Also, the quality of the sorting should be good enough to improve coding in coding block 365 in most cases. For this, a probabilistic sorting approach is employed.

The header fields 222-244 or 246-268 of a record 200 that are to be indexed can be considered as elements of a vector. Similarity between two records 200 can then be defined as the Euclidean distance between the end points of the two corresponding vectors. The distance d between the end points of two vectors x and y, each having elements 1 through n is given as:

$$d(x,y) = \sqrt{(x_1 - y_1) + ... + (x_n - y_n)} \quad \text{(Equation 1)}$$

This correlates with the notion that the fewer header fields 222-244 or 246-268 differ between two records 200 the greater the similarity between them is.

Sorting inside sorting block 320 is done through a kind of hashing in order to sort records 200 into hash buckets with similar records. In contrast to ordinary hashing, assigning a hash bucket 510-550 to a record 200 is not done on the basis of an exact match. Instead, records 200 will be assigned to hash buckets 510-550 in such a fashion that similarity between records 200 in each of the hash buckets 510-550 is high and similarity to records 200 in another hash bucket 510-550 is low.

In order to assign a hash bucket to a record 200, a vector v corresponding to the record 200 is transposed into a numeric value, i.e. a scalar, and the hash buckets 510-550 are assigned contiguous ranges. The hash bucket 510-560 with a range into which the scalar falls will be assigned to the vector v and therefore to the record 200. Transposition is done through a projection from a vector space with as many dimensions as there are header fields 222-244 or 246-268 to be indexed into a vector space that covers only one dimension, which is equivalent to a scalar:

$$h_{a,b}(\vec{v}) = \left\lfloor \frac{\vec{a}^T \cdot \vec{v} + b}{w} \right\rfloor \quad \text{(Equation 2)}$$

In Equation 2, $\lfloor \cdot \rfloor$ is the floor operation, a is a random vector that controls the transposition, w is the width of each of the hash buckets 510-550 and b is a random variable uniformly distributed between 0 and w. Variable b can be omitted for locality sensitive hashing. It is, however, convenient for certain mathematical proofs.

Depending on random vector a, a large distance between end points of two different vectors can be transposed into a large difference in the generated scalars using function h of equation 2. Transposition can however also lead to quite similar scalars.

Figure 6:
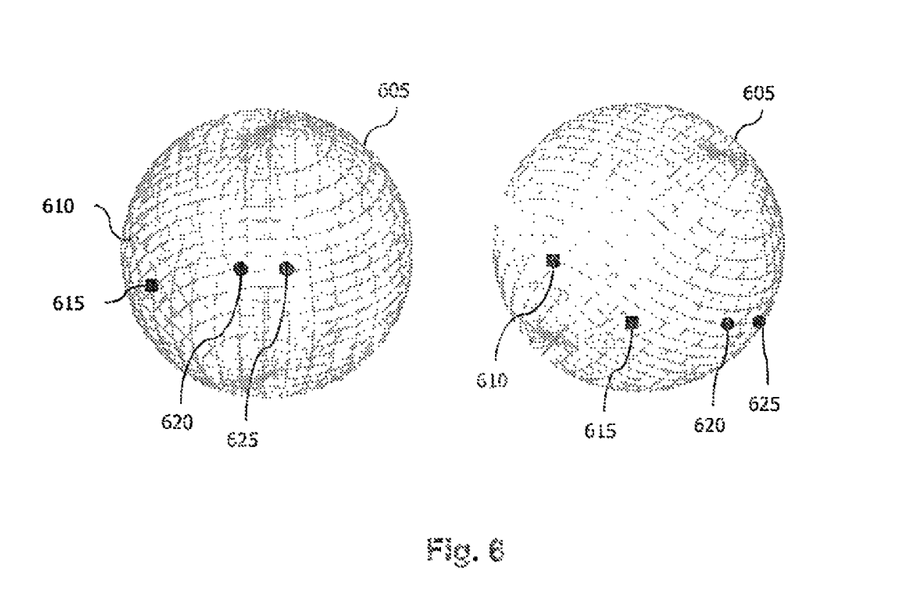
FIG. 6 illustrates an illustration of projections.

FIG. 6 illustrates the transposition process. Shown is a wire frame representation of a three dimensional sphere 605 from two perspectives in FIG. 6a and FIG. 6b. The different perspectives imply different projections of the points 610-625 into the paper plane. On the surface of the sphere 605, there are a first point 610 and a second point 615, each marked as a square.

Further, there are on the surface of the sphere 605 a third point 620 and a fourth point 625, each marked as a circle. The four points 610 to 625 are on the same relative locations on the sphere 605 in both representations. Each of the points 610 to 625 can be expressed as a vector of two elements, which can include a latitude and a longitude value with respect to a predetermined surface coordinate system on the sphere 605.

In the left representation, the first point 610 is on the far side of the sphere 605. In the paper plane, the distance between points 610 and 615 (squares) is about the same as between points 620 and 625 (circles). In the right representation, however, the distance between points 610 and 615 (squares) is noticeably longer than the distance between points 620 and 625 (circles).

Let the perspectives in the representations in the left and right portions of FIG. 6 be random picks. In terms of comparing the distances between the two pairs of points 610, 615 and 620, 625, the projection in the left portion of FIG. 6 is unlucky as it does not preserve the distance through the transposition and the projection in the right portion of FIG. 6 is lucky as it does preserve the distance. However, most projections are lucky as for most perspectives, far points 610, 615 will be projected into far points and close points 620, 625 will be projected into close points.

The effects of the unlucky projections can be minimized by performing several projections from different randomly chosen perspectives and taking an average of the individual results. This will work if the perspectives are chosen from random with a Gaussian distribution, that is each of the elements of the vector that controls the projection must be chosen independently from a Gaussian distribution. As the Gaussian distribution is 2-stable, elements that are close in the Euclidean distance sense (cf. Equation 1) will be mapped to the same range with a high probability and to distinct values otherwise.

In mathematical notation, locality sensitive hashing of a vector to a scalar can be given thus:

$$H_{a,b}(\vec{v}) = \sum_i h_{a_i,b_i}(\vec{v}) \bmod P \quad \text{(Equation 3)}$$

In equation 3, H is the hashing function, h is the function of Equation 2 and P is the number of hash buckets 510-550, preferably a large prime number. The result is an index k of the hash bucket 510-550.

A sorting that is performed according to the above equation 3 will assign the same hash bucket 510-560 to records 200 with similar header fields 222-244 or 246-268 and records 200 with dissimilar header fields 222-244 or 246-268 with a probability that depends on the number i of times that function h of equation 2 is applied and the number P of hash buckets 510-560 that are used. To improve this probability, i can be increased and/or P can be increased. The former will involve more computing effort and the latter will increase the memory space that is required for the hash table 555.

The determination of a hash bucket 510-560 on the basis of equation 3 is non deterministic as it relies on the random elements of random vector a and possibly on the random elements b. Applied to the same record 200, the locality sensitive hashing H will generally lead to different results as vector a will be based on different random numbers. The approach is also probabilistic, which implies a certain probability that the whole determination of equation 3 is unlucky and that a record 200 is assigned to a hash bucket 510-560 that contains records 200 that are dissimilar. While this probability can be made very low by controlling parameters i and P, it will never reach zero.

In order to further minimize this probability, each vector can additionally be assigned a scalar j that is determined in much the same fashion as the hash bucket:

$$J_{a,b}(\vec{v}) = \sum_i h_{a_i,b_i}(\vec{v}) \bmod Q \quad \text{(Equation 4)}$$

In equation 4, h is the function of equation 2 and Q is a predetermined number that reflects how many different sub-hash buckets inside one hash bucket 510-550 will be kept. Preferably, Q is a large prime number. The random values of a and b are freshly determined and not reused from the determination of equation 3.

The result j of equation 4 is stored along with record 200 in the previously determined hash bucket 510-560 and the records 200 inside each hash bucket 510-560 are sorted by this scalar j. Should for two similar records 200 the determination of the hash bucket 510-560 be unlucky so that they end up in the same hash bucket 510-560 while the other records 200 inside the hash bucket 510-560 are dissimilar to the two records 200, chances are that determination of j is less unlucky and the two records 200 are assigned scalars j that are close together.

Figure 7:
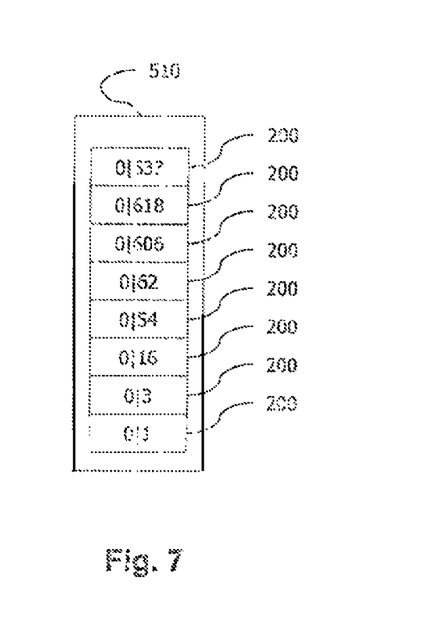
FIG. 7 illustrates an illustration of double sorting according to an embodiment of the present invention.

FIG. 7 demonstrates the process. Shown is a representation of records 200 in exemplary hash bucket 510 of hash table 555 of FIG. 5. Each record 200 has a first number which is the index k of the assigned hash bucket and a second number which is the assigned scalar j. Naturally, all values of k are the same which is 0 in this example. The records 200 are sorted by descending values of j, although an ascending sorting can also be used.

The lower five records 200 inside the hash bucket 510 have j values in the range between 1 and 62. The upper three records 200 have j values between 606 and 633. This means that the H function determined that all shown records 200 are similar while the J function suggests that the upper three records 200 are similar to each other and the lower five records 200 enjoy similarity while the upper three records 200 are quite dissimilar to the lower five records 200.

The effect is one of creating sub-hash buckets inside hash bucket 510 so that records 200 that were assigned to the hash bucket 510 with an unlucky H function will have a second chance of being sorted together through the J function. When hash bucket 510 is linearized and output to the output queue 560 in FIG. 5, the upper three records 200 will remain together and the lower five records 200 will remain together. This way, the goal of creating an order in the records 200 that will help bitmap index creation in indexing block 365 in FIG. 3 is reached even under bad conditions.

In one further embodiment, each record 200 is assigned another scalar o and records 200 with the same values of h and j are sorted by scalar o inside the hash buckets 510-560 of the hash table 555. Further nesting can be implemented as required.

Figure 8:
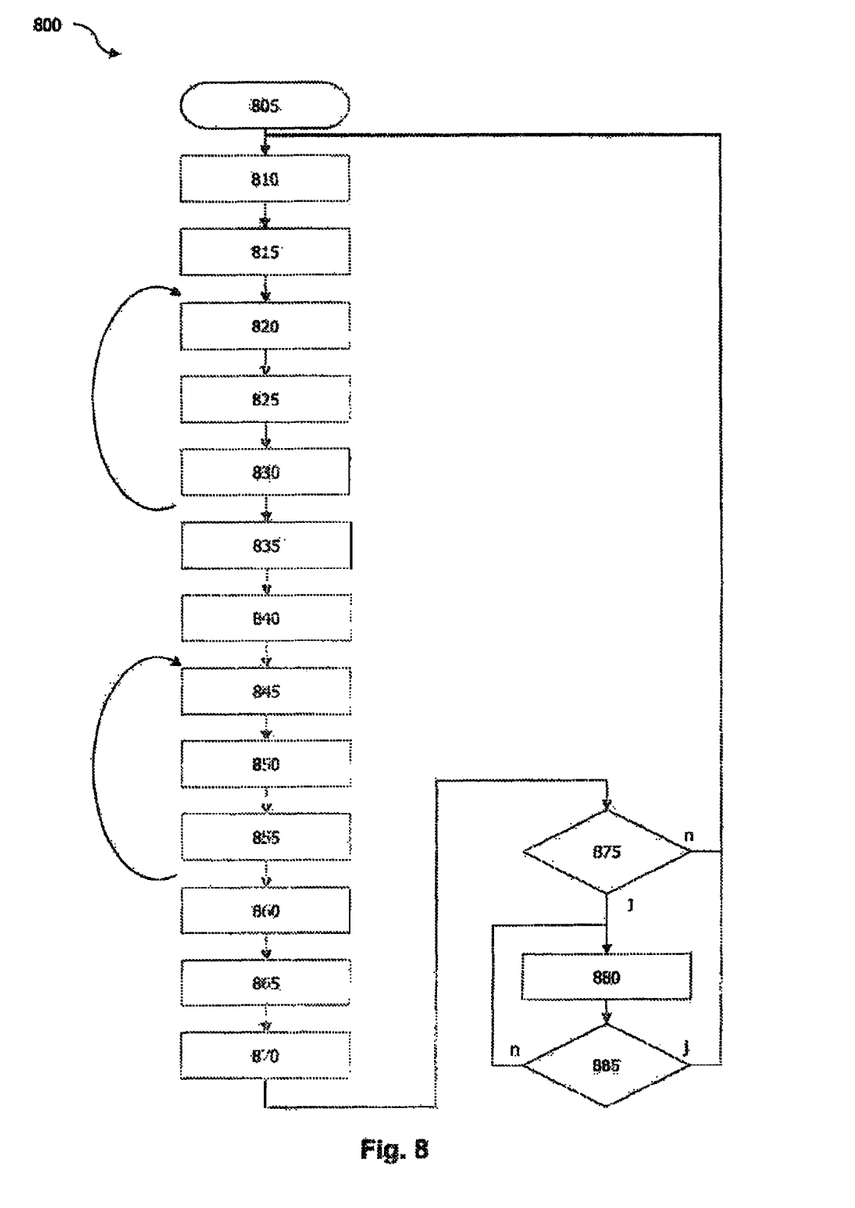
FIG. 8 illustrates a flow chard of a method for sorting records that employs a sorting block according to FIG. 5, and is according to an embodiment of the present invention.

FIG. 8 shows a flow chard of a method 800 for sorting records 200 of a stream 310 of communication in the computer network 100 with locality sensitive hashing. Method 800 implements equations 2 through 4 above and variables have the same names as described above in the context of these equations.

Method 800 begins with a step 805. In a step 810, one record 200 is read from the stream 310, such as via read head 505 in FIG. 5. In a step 815, predetermined header fields 222-244 or 246-268 of record 200 are selected and understood as elements of vector v.

In an ensuing step 820, random vector a is generated. Random vector a has the same dimensions as vector v and its elements are chosen from random numbers with a Gaussian distribution (normal distribution).

In step 825, the dot product (scalar product) of v and a is determined, which is a scalar. In one embodiment of the invention, a random number b which is also chosen from random numbers with a Gaussian distribution is added to the scalar.

In either case, the resulting number is summed up with the results from previous iterations of steps 820 through 830. Steps 820 through 830 are repeated a predetermined number i of times.

In a succeeding step 835, the summed up result from the particular iterations of steps 820 through 830 are subjected to a modulo division by the number P of hash buckets 510-550 of the hash table 555. In a step 840, the result is assigned to the record 200 as an index k to the determined hash bucket 510-550.

Steps 820 through 840 implement equation 3 above.

Steps 845 to 855 correlate with steps 820 to 830 and implement equation 4 above. In a step 845, another random vector a is generated from elements of a Gaussian distribution. In a step 850, the dot product between v and the newly determined random vector a is determined, which is a scalar.

As above, in one embodiment of the invention, random number b is added to the scalar. The result or the scalar is summed up with the results from previous iterations of steps 845 through 855. Steps 845 through 855 are repeated a predetermined number i of times, where the number i of times can be different from the number i of times steps 820 through 830 are executed.

In a following step 860, the summed up result from the particular iterations of steps 820 through 830 are subjected to a modulo division by the number Q that reflects how many different sub-hash buckets inside one hash bucket 510-550 will be kept. Q is preferably greater than P.

In other embodiments of the invention, however, Q can be the same number as P or smaller. In a step 865, the result is assigned to the record 200 as an index j that is kept together with record 200.

In a step 870, the record 200 is filed into the hash bucket 510-550 that is indicated by index h. Records 200 in that hash bucket 510-550 are sorted by ascending or descending indices j of each record 200.

In a step 875, it is determined if the number of elements 200 in the hash table 555 exceed a first predetermined threshold. If this is not the case, method 800 loops back to step 810 to start over. Otherwise, in a step 880 the hash bucket 510-550 with the highest number of records 200 is determined. The determined hash bucket 510-550 is then output to the output queue 560 and consecutively purged.

In a step 885 it is determined if the total number of records 200 in the hash table 555 is lower than a second predetermined threshold, where the second predetermined threshold is lower than the first predetermined threshold used in step 875. If this is the case, method 800 loops back to step 810 to start over. Otherwise, step 880 is repeated.

Figure 9:
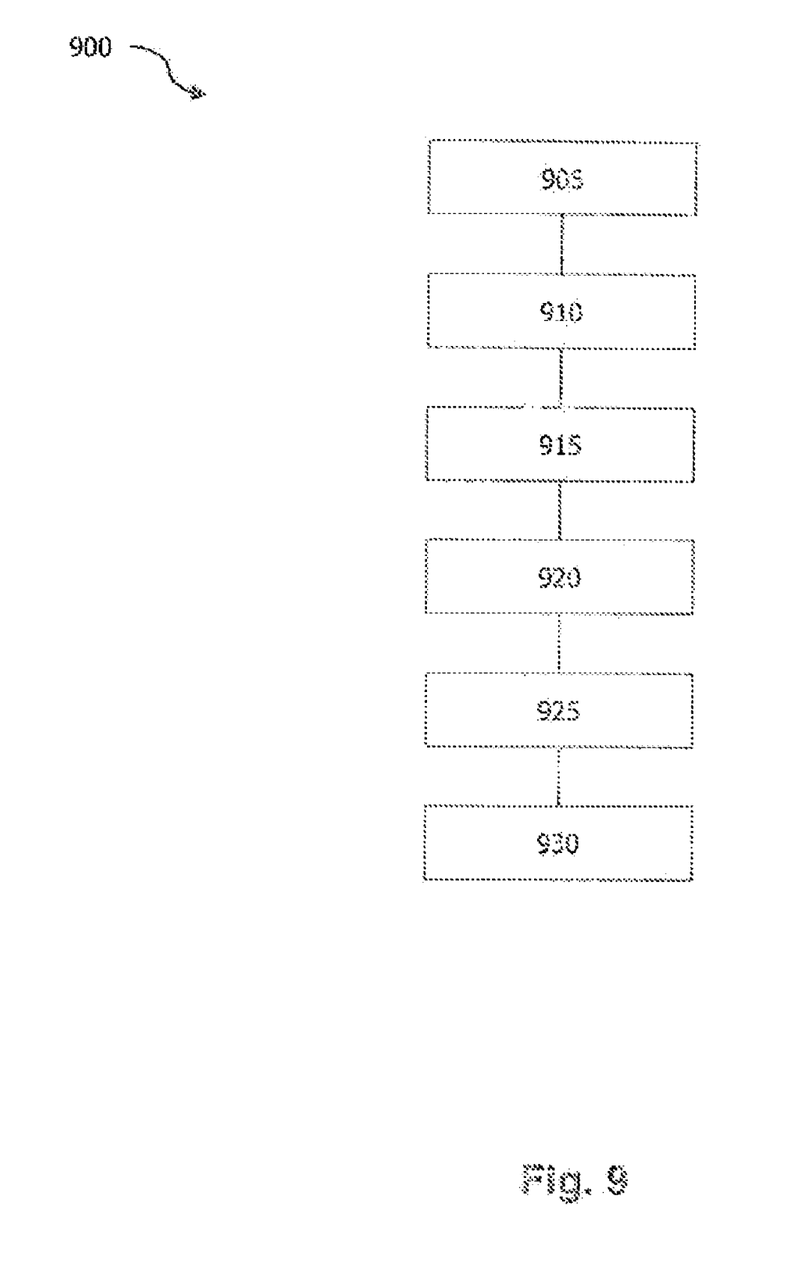
FIG. 9 illustrates a flow chart of a method for providing a compressed index for a stream according to an embodiment of the present invention.

FIG. 9 gives an overview of a complete method 900 for providing a compressed index for a stream 310 of data according to the network analysis tool 300 of FIG. 3. In a first step 905, records 200 are read in from the stream 310.

Then, the records are sorted in sorting block 320 according to method 800 of FIG. 8 in a successive step 910. In a step 915, the sorted records 200 are written to the bitmap index 400 inside bitmapping block 365. In a step 920, the columns 410 of the bitmap index 400 are coded inside coding block 370.

Finally, in a step 930, an entry 385 including the coded bitmaps 375 and a reference 380 to the original records 200 is saved in the first repository 390 and bodies of the records 200 are saved in compressed form in the second repository 395.

What is claimed is:

1. A computer implemented method for providing a compressed index for a stream of binary records, the method comprising the steps of:

sorting the stream of binary records by content of a predetermined field of each of the binary records;

transforming the predetermined field from each of the binary records into a bitmap index, wherein the bitmap index is a matrix having a separate column corresponding to each possible value in the predetermined field;

compressing bits in a column of the bitmap index by replacing a group of successive bits with a code;

wherein the sorting comprises the step of assigning, for each binary record, a hash bucket of a hash table on a basis of a locality sensitive hash function on the contents of the predetermined field, so that the probability for two of the binary records to be assigned to the same hash bucket increases with the similarity of the contents of the predetermined field between the binary records;

wherein if a total number of binary records held in the hash table exceeds a first predetermined number, the hash bucket that is assigned greatest number of binary records is output to an output stream until the total number of binary records held in the hash table falls below a second predetermined number;

wherein if a number of binary records held in one of the hash buckets exceeds a third predetermined number, the binary records in that hash bucket are output to the output stream; and wherein at least one step of the computer implemented method is executed on a computer device.

2. The method according to claim 1, wherein the locality sensitive hash function is generated by:

creating a first vector with the predetermined fields as elements;

creating a second vector with random numbers of a Gaussian distribution as elements;

projecting the first vector onto a scalar by generating the dot product of the first vector and the second vector; and determining the hash bucket on the basis of the scalar.

3. The method according to claim 2, wherein determining the hash bucket comprises the steps of:

determining a predetermined number of scalars for the first vector on the basis of different second vectors by means of the locality sensitive hash function;

determining a sum of the scalars; and assigning the hash bucket on the basis of a modulo division of the sum by the number of hash buckets in the hash table.

4. The method according to claim 2, wherein the stream is a communication data stream between computers in a computer network.

5. The method according to claim 3, wherein the stream is a communication data stream between computers in a computer network.

6. The method according to claim 1, further comprising the steps of:

assigning, for each binary record, a scalar quantity on a basis of another locality sensitive hash function that is independent from the first locality sensitive hash function; and sorting the binary records inside each hash bucket according to the determined quantities of the binary records.

7. The method according to claim 6, wherein the stream is a communication data stream between computers in a computer network.

8. The method according to claim 1, wherein the stream is a communication data stream between computers in a computer network.

9. The method according to claim 8, wherein the predetermined field comprises a source address, a destination address, a source port, a destination port and a protocol type of a communication between computers on a network.

10. A computer readable storage medium tangibly embodying a computer readable program code having non-transitory computer readable instructions which, when implemented, cause a computer to carry out the steps of a method according to claim 1.

11. A computer implemented method for providing a compressed index for a stream of binary records, the method comprising the steps of:

sorting the stream of binary records based on a similarity of a content of a predetermined field associated with the binary records, wherein part of the sorting is accomplished by assigning each binary record to a hash bucket of a hash table on a basis of a locality sensitive hash function on the contents of the predetermined fields, so that the probability for two of the binary records to be assigned to the same hash bucket increases with the similarity of the contents of the predetermined field between the two binary records;

transforming the predetermined field from each of the binary records into a bitmap index, wherein the bitmap index is a matrix having a separate column corresponding to each possible value in the predetermined field;

compressing bits in a column of the bitmap index by replacing a group of successive bits with a code;

wherein if a total number of binary records held in the hash table exceeds a first predetermined number, the hash bucket that is assigned greatest number of binary records is output to an output stream until the total number of binary records held in the hash table falls below a second predetermined number;

wherein if a number of binary records held in one of the hash buckets exceeds a third predetermined number, the binary records in that hash bucket are output to the output stream; and wherein at least one step of the computer implemented method is executed on a computer device.

12. The method according to claim 11, wherein the locality sensitive hash function is generated by:

creating a first vector with the predetermined fields as elements;

creating a second vector with random numbers of a Gaussian distribution as elements;

projecting the first vector onto a scalar by generating the dot product of the first vector and the second vector; and determining the hash bucket on the basis of the scalar.

13. The method according to claim 12, wherein determining the hash bucket comprises the steps of:

determining a predetermined number of scalars for the first vector on the basis of different second vectors by means of the locality sensitive hash function;

determining a sum of the scalars; and assigning the hash bucket on the basis of a modulo division of the sum by the number of hash buckets in the hash table.

14. A computer readable storage medium tangibly embodying a computer readable program code having non-transitory computer readable instructions which, when implemented, cause a computer to carry out the steps of a method according to claim 11.

* * * * *